US007030905B2

(12) United States Patent
Carlbom et al.

(10) Patent No.: US 7,030,905 B2
(45) Date of Patent: Apr. 18, 2006

(54) REAL-TIME METHOD AND APPARATUS FOR TRACKING A MOVING OBJECT EXPERIENCING A CHANGE IN DIRECTION

(75) Inventors: Ingrid Birgitta Carlbom, Summit, NJ (US); Agata Opalach, Grenoble (FR); James Edward West, Plainfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 630 days.

(21) Appl. No.: 10/062,800

(22) Filed: Jan. 31, 2002

(65) Prior Publication Data

US 2003/0142210 A1 Jul. 31, 2003

(51) Int. Cl.
*H04N 7/18* (2006.01)

(52) U.S. Cl. ...................... 348/157; 348/169; 348/699; 348/159; 348/153; 348/154; 348/155; 348/143; 375/240.16; 375/240.01; 382/236

(58) Field of Classification Search ................ 348/157, 348/143, 153, 154, 155, 159, 142, 169, 352, 348/699; 375/240.16, 240.01; 382/236
See application file for complete search history.

(56) References Cited

U.S. PATENT DOCUMENTS 5,231,483 A * 7/1993 Sieber et al. ............... 348/169
5,717,414 A * 2/1998 Bergsneider et al. .......... 345/8
5,764,283 A 6/1998 Pingali et al. .............. 348/169
6,005,610 A 12/1999 Pingali ....................... 348/169
6,233,007 B1 5/2001 Carlbom et al. ............ 348/157
6,409,687 B1 * 6/2002 Foxlin ........................ 600/595
6,507,366 B1 * 1/2003 Lee ............................ 348/352
6,556,246 B1 * 4/2003 Suda .......................... 348/352

OTHER PUBLICATIONS

Huang et al., *Real-Time Passive Source Localization: A Practical Linear-Correction Least-Squares Approach*, IEEE Transactions On Speech And Audio Processing, vol. 9, No. 8, Nov. 2001, pp. 943-956.
*FastCAM Replay*, http://www.fastcamreplay.com/home_fstcam.htm.

* cited by examiner

*Primary Examiner*—Shawn S. An
(74) *Attorney, Agent, or Firm*—Kenneth M. Brown

(57) ABSTRACT

A method and apparatus for tracking an object using one or more video cameras together with a plurality of microphones and/or geophones, whereby accurate tracking of the object can be obtained even when the object changes directions as a result of an impact. A tennis ball may be tracked during a tennis match. Prior to and after an impact, the ball is tracked with the use of video cameras, illustratively in accordance with the method disclosed in U.S. Pat. No. 6,233,007. Then, the position of the ball at racket or ground impact is accurately determined by measuring the acoustical waves generated by the ball hitting the racket and/or either the acoustic waves or the elastic (Rayleigh) waves generated by the ball hitting the ground, respectively. Tracking then advantageously continues with use of the video cameras.

32 Claims, 4 Drawing Sheets

101 AUDIO/ RAYLEIGH 1
102 AUDIO/ RAYLEIGH 2
103 AUDIO/ RAYLEIGH 3
111 FILTER BACK-GROUND NOISE
112 FILTER BACK-GROUND NOISE
113 FILTER BACK-GROUND NOISE
121 FIND PEAK IN SIGNATURE
122 FIND PEAK IN SIGNATURE
123 FIND PEAK IN SIGNATURE
131 FIND RELATIVE DELAYS
132 FIND RELATIVE DELAYS
141 DETERMINE CONFUSION HYPERBOLA
142 DETERMINE CONFUSION HYPERBOLA
150 FIND FOUR INTERSECTION POINTS
160 DISAMBIGUATE

REAL-TIME METHOD AND APPARATUS FOR TRACKING A MOVING OBJECT EXPERIENCING A CHANGE IN DIRECTION

FIELD OF THE INVENTION

The present invention relates generally to a method and apparatus for performing real-time tracking of moving objects, such as, for example, balls, pucks, and the like, in connection with sporting events, whereby trajectories corresponding to the movement of the objects are determined and such trajectory information may be used to derive information corresponding to the movement and location of the objects being tracked. More particularly, the present invention relates to a method and apparatus for the tracking of an object such as a tennis ball when the trajectory of the object experiences a sudden change in direction.

BACKGROUND OF THE INVENTION

One field in which real time tracking of object motion can be advantageously employed, but is not currently greatly utilized, is in the field of sports. For example, continuous tracking of the motion of a tennis ball during a tennis match can provide a wealth of valuable information, including, for example, information about the skill or strategy of a player, because information such as ball speed and ball placement would be readily obtainable therefrom. Moreover, the trajectory of the ball, for example, obtained through such real time tracking, can be advantageously used to obtain other information of interest, and can also be used to form the basis for virtual camera views of play from any desired position, as well as forming the basis for virtual replays of portions of the match.

Historically, the only conventional form of tennis ball tracking that was available was the radar gun, whose operation is fully familiar to those skilled in the art and which could be used simply to measure the speed of the tennis ball, such as, for example, to determine the speed of service by a given player. But recently, in U.S. Pat. No. 6,233,007, "Method and Apparatus for Tracking Position of a Ball in Real Time," issued on May 15, 2001 to I. Carlbom et al. (hereinafter, "Carlbom et al.") a method and apparatus for tracking moving objects used in connection with athletic activities or sporting events, especially, balls, pucks, and the like, was disclosed. More particularly, the disclosure provides an apparatus and method for obtaining information corresponding to the object being tracked, which information may be advantageously used in a computer-generated replay of the sporting event (or some part thereof) using computer generated characters moving in accordance with motion data collected from real time tracking of the sporting event, and/or may be advantageously used to determine certain characteristics of the sporting event, such as ball speed, ball landing positions, etc. In particular, the disclosed method and apparatus is intended to be especially useful for enhancing television coverage of sporting events. U.S. Pat. No. 6,233,007, which is commonly assigned to the assignee of the present invention, is hereby incorporated by reference as if fully set forth herein.

Specifically, the method disclosed in U.S. Pat. No. 6,233,007 includes the steps of differencing present and previous frames of a video image including, for example, the ball, to obtain motion regions; converting the motion regions to a hue-saturation-intensity (HSV) color space; extracting the region corresponding to the ball based on empirical color data about the ball; obtaining a motion vector based on the motion of the ball region from a previous frame to the current frame; and updating the ball trajectory based on the newest motion vector obtained. The disclosed method also preferably includes a step of identifying completed trajectories based on preset constraints, and is preferably expanded on by using a at least one pair of cameras to provide a three-dimensional trajectory and sometimes preferably expanded on by using a plurality of cameras, especially a plurality of pairs of cameras. An apparatus according to the invention disclosed in U.S. Pat. No. 6,233,007 includes at least one camera connected to a computer which operates to difference previous and current frames, compute the ball track, convert ball regions to HSV color space and output the tracking and video information. And in a case where one or more pairs of cameras are used, the computer is preferably also provided with a stereo matching device or module for matching the tracking results from respective cameras and/or respective pairs of cameras.

Other (earlier) prior art had been generally directed to the tracking of people, which may be advantageously used in various applications such as, for example, in telecommunications applications, in store (e.g., supermarket) security applications, or in following the movement of players in tennis matches. The latter two applications are embodied, for example, in U.S. Pat. No. 5,764,283, "Method and Apparatus for Tracking Moving Objects in Real Time Using Contours of the Objects and Feature Paths," issued on Jun. 9, 1998 to S. Pingali et al., where a method and apparatus for tracking moving objects, such as people, in real time is disclosed in which local features, such as extrema of curvature on boundary contours, are tracked, and trajectories of motion are derived by dynamically clustering the paths of motion of the local features. Specifically, existing feature paths from a current video frame are grouped together with preexisting clusters from previous video frames by selecting, as a candidate cluster to a specified feature path, the cluster having the closest relative distance to the specified feature path. U.S. Pat. No. 5,764,283, which is commonly assigned to the assignee of the present invention, is hereby incorporated by reference as if fully set forth herein.

And then, in U.S. Pat. No. 6,005,610, "Audio-Visual Object Localization and Tracking System and Method Therefor," issued on Dec. 21, 1999 to S. Pingali (hereinafter, "Pingali"), a method for integrated audio-visual localizing and tracking of an object (e.g., a person) with particular application to telecommunications is disclosed. Specifically, the method includes the steps of capturing and transmitting an image of a video scene using a camera at an instant of time; identifying an object contained in the image having a preselected visual feature; and estimating a location of the object by determining an angular orientation relative to the image plane of the camera of an imaginary line extending from an optical center of the camera to a point on the image plane of the camera representing a portion of the object. The disclosed method further includes the steps of converting acoustic waves from an audio source into audio signals using at least two microphones at substantially the same time, and identifying the audio source by determining a locus of points representing an estimate of the location of the audio source on the basis of the audio signals. An improved estimate of the location of the object is then advantageously computed by determining the location of a region of intersection between the imaginary line and the locus. U.S. Pat. No. 6,005,610, which is commonly assigned to the assignee of the present invention, is hereby incorporated by reference as if fully set forth herein.

And lastly, FastCAM Replay, LLC, is a company which offers ultra-high-speed digital cameras for use in television sports coverage. In particular, FastCAM Replay digital cameras record up to 500 images-per-second—significantly more than the conventional 90 frames-per-second "Super Slow Mo" cameras previously used in sports coverage—to determine, for example, the landing spot of a tennis ball on or near court lines with great accuracy. Unfortunately, the very high speed camera approach used is not suitable for continuous tracking applications because these cameras provide a very narrow field of view and are very costly—thus, practical considerations (e.g., number of required cameras and the associated cost) restrict the use of such a technique to limited applications such as line calling.

Note that the above-described sports related prior art tracking systems which use video cameras assume that the object being tracked (e.g., a tennis ball) is visible from a small set of cameras positioned around a stadium. While the ball is, in fact, typically visible when in flight, it is often obscured when the opposing player approaches the ball with a racket to return the ball by a volley or ground stroke. Furthermore, since the video cameras sample the environment at discrete time intervals, the exact location where the ball hits the ground may not be recorded even when the ball is fully visible from the ball tracking cameras. Current methods typically calculate the point of ball impact by extrapolating the calculated ball trajectory to intersect the ground plane, leading to substantial inaccuracy in the determination of the exact ball landing position.

As a result of the above, current tennis ball tracking systems are essentially limited to tracking the ball of a serve, and cannot adequately continue tracking the ball without the determination of the exact time of when and/or position of where the ball changes direction whenever it, in fact, does so.

SUMMARY OF THE INVENTION

In accordance with the present invention, a novel method and apparatus for tracking an object using at least one video camera together with a plurality of microphones and/or geophones is provided, whereby accurate tracking of the object can be advantageously obtained even when the object changes directions as a result of an impact. Illustratively, a tennis ball may be advantageously tracked during a tennis match with use of the present invention. Specifically, prior to impact, the ball may, for example, be tracked with use of (preferably two or more) video cameras, illustratively in accordance with the method disclosed in U.S. Pat. No. 6,233,007 (Carlbom et al.—see discussion in "Background of the Invention" section, above). Then, the position of the ball at racket or ground impact may be advantageously determined by measuring the acoustical waves generated by the ball hitting the racket, and/or either the acoustic or the elastic waves generated by the ball hitting the ground, respectively.

(As used both in the art and herein, a wave traveling through the air is referred to as an acoustic wave, whereas a wave traveling through a solid medium, such as, for example, the ground, is referred to as an elastic wave. Similarly, a microphone is a device for detecting and receiving acoustic waves, whereas a geophone is a device for detecting and receiving elastic waves—i.e., an electronic receiver for measuring seismic vibrations. Note specifically that geophones respond to the particle motion of the elastic medium, whereas microphones respond to dynamic pressure in the air.)

In combination with video camera based ball tracking methods, such as, for example, the method of Carlbom et al. described above, the acoustic and/or elastic wave analysis of the present invention illustratively allows for the tracking of a tennis ball in continuous play with volleys and ground strokes. The position of the ball at racket impact may advantageously act as a starting position for the illustrative video camera based tracking process in each direction, and/or may act as an initial starting position for the beginning of the overall tracking process (e.g., in response to a serve). The position of the ball at ground impact may advantageously provide an accurate position for the ball bounce, thereby resulting in an accurate ball trajectory, and/or may act as a terminating position for the tracking process (e.g., when the ball lands outside the appropriate court boundaries).

Specifically, the present invention provides a method and apparatus for tracking an object using one or more video cameras and a plurality of wave receivers, the video cameras outputting corresponding video images including a sequence of video frames, each of the wave receivers for use in determining an arrival of a wave, the method or apparatus comprising steps or means (respectively) for obtaining a first current frame and a corresponding previous frame from each of said video images, wherein each of said frames includes an image of the object; determining a first motion vector corresponding to a first direction of motion of the object based on said first current frames and said corresponding previous frames from each of said video images; detecting an arrival of a wave by each one of one or more pairs of said wave receivers; determining one or more time differences between each of said arrivals of said wave at each of said one or more pairs of wave receivers; determining a location of a change in direction of said object by identifying a source location from which said wave has been generated based on said plurality of time differences; obtaining a second current frame from each of said video images, wherein each of said frames includes an image of the object; and determining a second motion vector corresponding to a second direction of motion of the object based on said second current frames from each of said video images and based on said determined location of said change in direction of said object, said second motion vector representing a direction of motion of said object after said change in direction of said object has occurred.

Moreover, the present invention also specifically provides a method and apparatus for initiating a process of tracking an object using one or more video cameras and a plurality of wave receivers, the video cameras outputting corresponding video images including a sequence of video frames, each of the wave receivers for use in determining an arrival of a wave, the method and apparatus comprising steps or means (respectively) for detecting an arrival of a wave by each one of one or more pairs of said wave receivers; determining one or more time differences between each of said arrivals of said wave at each of said one or more pairs of wave receivers; determining an initial location of said object by identifying a source location from which said wave has been generated based on said plurality of time differences; obtaining a video frame from each of said video images, wherein each of said frames includes an image of the object; and determining an initial motion vector corresponding to an initial direction of motion of the object based on said video frames from each of said video images and based on said determined initial location of said object.

And finally, the present invention also specifically provides a method and apparatus for terminating a process of tracking an object using one or more video cameras and a plurality of wave receivers, the video cameras outputting corresponding video images including a sequence of video frames, each of the wave receivers for use in determining an arrival of a wave, the method and apparatus comprising steps or means (respectively) for obtaining a current frame and a corresponding previous frame from each of said video images, wherein each of said frames includes an image of the object; determining a motion vector corresponding to a direction of motion of the object based on said current frames and said corresponding previous frames from said video images; detecting an arrival of a wave by each one of one or more pairs of said wave receivers; determining one or more time differences between each of said arrivals of said wave at each of said one or more pairs of wave receivers; determining a location of said object by identifying a source location from which said wave has been generated based on said plurality of time differences; and terminating said tracking process based on the determined location of said object.

DETAILED DESCRIPTION

Figure 1:
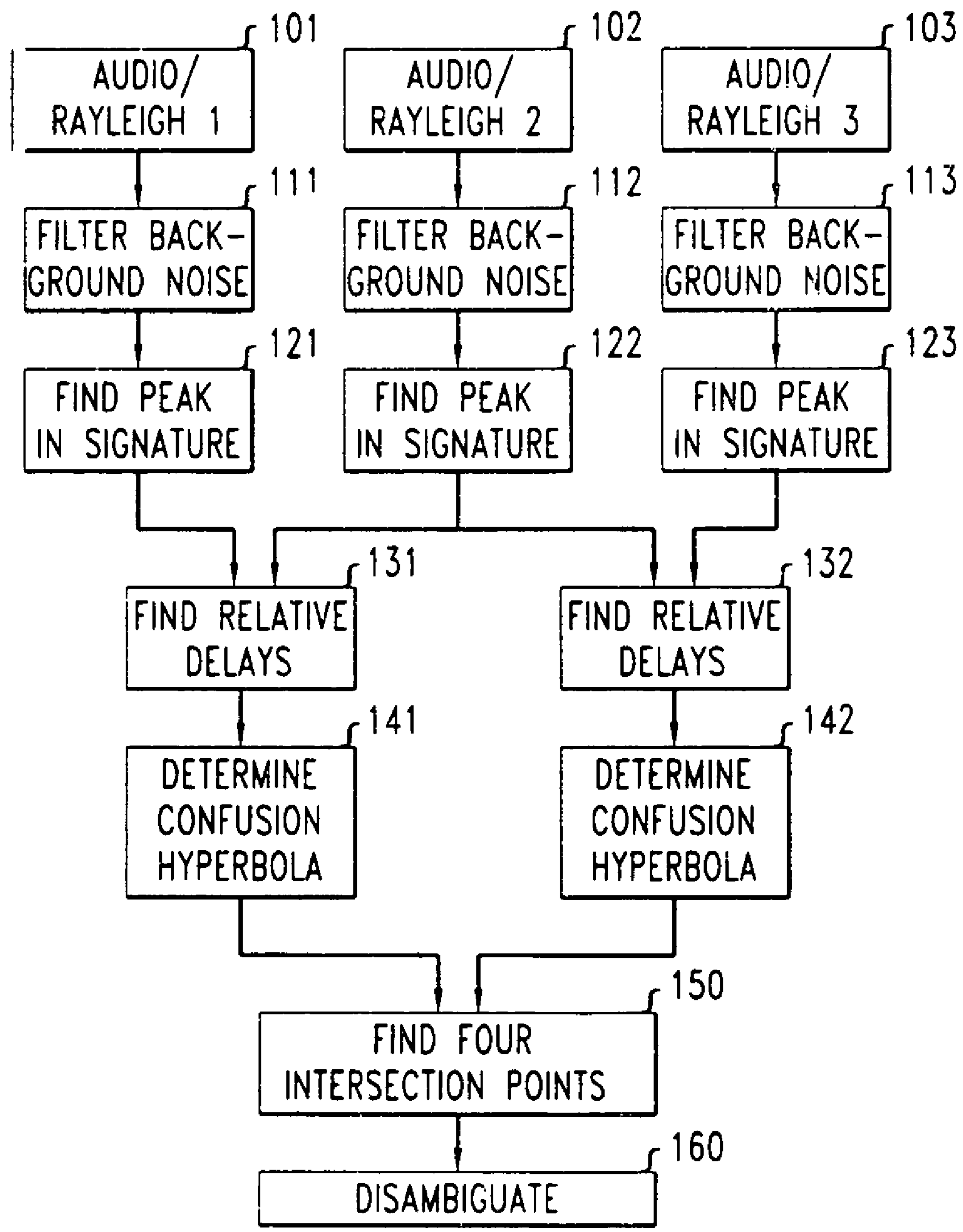
FIG. 1 diagrams an illustrative method for identifying a source location of a wave on a two dimensional surface with the use of three microphones or geophones in accordance with certain illustrative embodiments of the present invention.

An Illustrative Embodiment for Determining where the Racket Hits the Ball

The impact of a tennis racket hitting a tennis ball (the acoustic source) generates an acoustic wave with a well defined peak and with a signature quite distinct from the ambient background noise. For example, the technique of adaptive impulse detection, well known to those skilled in the art, may be advantageously used to identify the particular type of acoustic signature created by the impact of the a tennis racket hitting a tennis ball.

In particular (and as will also be clear to those of skill in the art), various adaptation criteria may be advantageously employed, such as, for example, a threshold for background noise removal; the duration between successive impulses; frequency characteristics of the acoustic signature of the a ball hitting different court surfaces; frequency characteristics of the acoustic signature of a ball hitting a racket; frequency characteristics of the acoustic signature of feet hitting the court surface; and frequency characteristics of the acoustic signature of a racket (accidentally) hitting the ground. As such, it will be obvious to those skilled in the art that acoustic recognition of the particular sound of the racket hitting the ball may be easily performed, since such a sound may be easily distinguished from other sounds which may be received by the microphones used herein.

For example, background noise may be advantageously removed, and peaks in the signal may be advantageously made more dominant by thresholding the signal, the threshold being determined, for example, through a measurement of the ambient noise at the particular tennis court. Alternatively, a median filter may be applied to the signal, subtracting the filtered signal from the original signal, with the result of retaining all significant peaks in the original signal. Then the magnitude of the peak combined with the duration between the peaks may be advantageously used to locate the peak corresponding to the ball hitting the racket. In accordance with one illustrative embodiment of the present invention, the video sequence may advantageously be used to further localize the peak in the audio signal. Moreover, bandpass filters may be advantageously applied to select from the audio signal the dominant frequency components corresponding to the ball hitting the racket and the ball hitting the court, and adapting these filters to the different racket and ball types as well different court types.

Thus, one illustrative embodiment of the present invention determines where the racket hits the ball by determining the relative delay between the arrival of the direct sound from the acoustic source at a multiplicity of microphones, and thereby advantageously determines the location of the source with respect to the microphones. In particular, the difference in arrival time of the acoustic wave between any pair of microphones can be advantageously used to determine a locus of possible source locations, by making use of the following formula specifying the (applicable) speed of sound:

$$c=331.4\sqrt{T/273}\ m/sec, \quad (1)$$

where T is the ambient temperature in degrees Kelvin. (This formula is well known to those of ordinary skill in the art and may be found, for example, in *Acoustics*, F. E. Terman, Consulting Editor, McGraw-Hill Book Company, Inc., New York, 1954, p.10.)

As will be clear to those of ordinary skill in the art, the above analysis results in a locus of possible source locations which is a 3D hyperboloid (which will be referred to herein as the confusion hyperboloid). Then, the intersection of a multiplicity of such hyperboloids, which advantageously result from the selection of various microphone pairs, may then be advantageously used to determine the source location (e.g., the particular spatial location where the racket has hit the ball). Note that, preferably, at least three, and more preferably, at least four distinct confusion hyperboloids are generated, so that the source location can be advantageously identified as a unique point in three dimensional space. (Note also that wherein three distinct confusion hyperboloids may be generated with use of three microphones, which allows for three distinct microphone pairings, the generation of four distinct confusion hyperboloids requires the use of at least four microphones.)

More specifically, note that a 3D hyperboloid has two sheets. The intersection of two hyperboloids (generated, for example, with use of two distinct pairs of a set of at least three microphones) is a (2D) hyperbola (or an ellipse if the three microphones used to generate the two hyperboloids are either co-linear or close to being co-linear). Then, in accordance with an illustrative embodiment of the present invention, a third hyperboloid (generated, for example, with use of a third distinct pair of the aforementioned set of at least three microphones) may be advantageously used to find four possible source locations—namely the intersection points of the (2D) hyperbola with the third (3D) hyperboloid. If two of these possible source locations are located below ground level, then we advantageously need only to disambiguate between the other two, which may be easily done based on the minimum acoustic wave travel time (i.e., based on which of the two microphones in the appropriate microphone pair received the acoustic wave first). Otherwise, however, a fourth microphone (advantageously not in the plane of the other three) may be used to generate a fourth confusion hyperboloid, which can be advantageously used to disambiguate the result obtained from the first three hyperboloids.

It should be pointed out that in accordance with certain illustrative embodiments of the present invention, it may be advantageous to use more than four microphones as specifically employed in the illustrative embodiment described above, as this may advantageously improve the accuracy of the source localization. In particular, in such a case, measurements from such a "redundancy" of microphones may be advantageously used to create an "over determined system of equations"—as will be familiar to those skilled in the art—which can then be solved by optimization techniques, which are also well known to those skilled in the art.

One Illustrative Embodiment for Determining where the Ball Hits the Ground

In a wholly analogous manner to that described above, one illustrative embodiment of the present invention determines the relative delay between the arrival of the direct sound from the acoustic source at a multiplicity of microphones, and thereby advantageously determines the location of the source with respect to the microphones, when the acoustic source comprises the impact of the ball on the ground (rather than the impact of the ball hitting the racket). Specifically, note that the acoustic signature of the ball hitting the ground (the acoustic source, in this instance) will be distinct not only from the ambient background noise but also from the acoustic signature of the ball hitting the racket. Again, the well known technique of adaptive impulse detection, familiar to those skilled in the art, may be advantageously used to identify the particular type of acoustic signature created by the impact of a tennis ball hitting the ground. (See discussion above.)

Thus, just as the location of where the racket hits the ball can be determined with use of a plurality of microphones (by measuring the relative delays of the arrival of the acoustic signature at a plurality of microphone pairs), so can the location of where the ball hits the ground. As such, in accordance with one illustrative embodiment of the present invention, the location of where the ball hits the ground is advantageously determined with use of a plurality of microphones which can be used to provide a plurality of (2D) hyperbola (which will be referred to herein as the confusion hyperbola), similar to the plurality of (3D) confusion hyperboloids, as described above.

More specifically, note that a hyperbola has two branches. In accordance with an illustrative embodiment of the present invention, a minimum of three microphones are employed. Moreover, these microphones are advantageously not co-linear. Thus, note that two confusion hyperbola as generate from two distinct pairs of microphones can intersect in four places. Then, in order to identify the desired source location, we advantageously may use minimum acoustic wave travel time to disambiguate (i.e., based on which of the two microphones in each appropriate microphone pair received the acoustic wave first.) Note that in the "degenerate" case, where the travel times of the acoustic wave to the two microphones in a pair are equal, the hyperbola degenerates to a line and thereby reduces the number of intersection points (eliminating the need for a corresponding disambiguation).

Another Illustrative Embodiment for Determining where the Ball Hits the Ground

In accordance with another illustrative embodiment of the present invention, Rayleigh surface waves which are generated by the impact of the ball on the surface may be advantageously measured, thereby determining where the ball hits the ground. This approach advantageously provides improved accuracy in determining the point of ground impact (as compared to that of measuring the generated acoustic waves), and also advantageously provides an easy distinction between the tasks of determining when the ball hits the racket and when the ball hits the ground, even when the racket is very close to the ground. (Note that a tennis ball hitting the ground will generate a Rayleigh wave with a distinct pulse or signature, and so one can easily differentiate between the ball hitting the racket and the ball hitting the ground. Greater accuracy may also be achieved because waves will be detected only from sound traveling along the surface of the court and so little ambient noise from the sidelines, airplanes, and the like, will be detected.)

Rayleigh surface waves are fully familiar to those skilled in the art. (For a comprehensive treatise on Rayleigh waves, see, for example, *Wave Propagation in Elastic Solids* by J. D. Achenbach, North-Holland Publishing Company, New York, 1976.) As is well known to those of ordinary skill in the art, these waves travel along the surface of an elastic halfspace, and can be measured at the surface by either microphones or geophones. In addition, and as is also well known in the art, the phase velocity of the Rayleigh wave may be expressed as follows:

$$\left(2-\frac{c^2}{c_T^2}\right)-4\left(1-\frac{c^2}{c_L^2}\right)^{\frac{1}{2}}\left(1-\frac{c^2}{c_T^2}\right)^{\frac{1}{2}}=0, \tag{2}$$

where $C_T$ and $C_L$ are the phase velocities of the longitudinal (P) and transverse (S) waves, respectively. As is also fully familiar to those of ordinary skill in the art, a longitudinal wave is one in which the motion is parallel to the direction of propagation, and is also known as an irrotational wave, a dilational wave, or a P-wave (primary or pressure wave); and a transverse wave is one in which the motion is normal to the direction of propagation, and is also known as a rotational wave, a shear wave, or an S-wave (secondary or shear wave). It is also well known that the velocity of the Rayleigh wave for a particular surface can be inferred either from direct measurements or indirectly by determination of the velocities of the P and S waves.

Note that the ball hitting the surface (i.e., at the source location) advantageously generates an elastic wave with a well defined peak and with a signature distinct from other elastic waves generated, for example, by the player moving over the surface. Again, the well known technique of adaptive impulse detection, familiar to those skilled in the art, may be advantageously used to identify the particular type of acoustic signature created by the impact of a tennis ball hitting the ground. (See discussion of adaptive impulse detection above.)

Thus, one illustrative embodiment of the present invention determines the location of where the ball hits the ground by determining the relative delay between the arrival of the generated Rayleigh wave at a multiplicity of geophones or at a multiplicity of microphones, and thereby advantageously determines the location of the source with respect to the geophones or microphones. Note that the use of geophones for detecting Rayleigh surface waves is preferred, although microphones placed near the ground may also be used. (With the use of geophones, there is advantageously no need to filter out background noise from the sidelines or elsewhere, although footsteps should be advantageously handled in either case.)

The difference in the arrival time of the wave at two geophones (or microphones) combined with formula (2) above advantageously determines the locus of possible source locations. The result is a 2D (two-dimensional) hyperbola on the surface (which again will be referred to herein as the confusion hyperbola). The intersection of a multiplicity of such confusion hyperbola (preferably, at least two hyperbola as generated with use of at least three geophones or microphones), may be advantageously used to determine the source location, just as in the illustrative embodiment for determining where the ball hits the ground described above—i.e., where the determination of the location of where the ball hits the ground is illustratively determined based on the arrival of acoustic, rather than elastic, waves.

It should be pointed out that in accordance with certain illustrative embodiments of the present invention, it may be advantageous to use more than three geophones as specifically employed in the illustrative embodiment described above, as this may advantageously improve the accuracy of the source localization. In particular, in such a case, measurements from such a "redundancy" of geophones may be advantageously used to create an "over determined system of equations"—as will be familiar to those skilled in the art—which can then be solved by optimization techniques which are also well known to those skilled in the art. Moreover, even further redundancy may be advantageously obtained by separating and "independently" using both the P waves and the S waves associated with the given Rayleigh waves.

An Illustrative Method for Identifying a Source Location of a Wave in Two Dimensions FIG. 1 diagrams an illustrative method for identifying a source location of a wave on a two dimensional surface with the use of three microphones or geophones in accordance with certain illustrative embodiments of the present invention. The three microphones or geophones are shown as blocks 101, 102 and 103 in the figure. Blocks 111, 112 and 113 advantageously perform an initial filtering of the background noise from the signals received by the microphones/geophones. Then, blocks 121, 122 and 123 find the peaks in the corresponding signature of the resultant (i.e., noise-filtered) signals. For example, the tasks of blocks 121, 122 and 123 may make use of an adaptive impulse detection technique, as described above and as is fully familiar to those skilled in the art, in order to identify the particular signature of interest (e.g., the signature of a tennis ball hitting the ground).

Once the peaks corresponding to the desired signature have been located, blocks 131 and 132 find the relative delays between the signals from each of two pairs of microphones/geophones—i.e., from microphone/geophone 1 and microphone/geophone 2 (as shown in blocks 101 and 102), and from microphone/geophone 2 and microphone/geophone 3 (as shown in blocks 102 and 103), respectively. Based on these two relative delays, blocks 141 and 142 determine corresponding confusion hyperbola, as described above. Then, based on these two confusion hyperbola, four intersection points are identified by block 150, and finally, as also described above, disambiguation amongst these four points is performed by block 160 to identify the source location of the wave.

Figure 2:
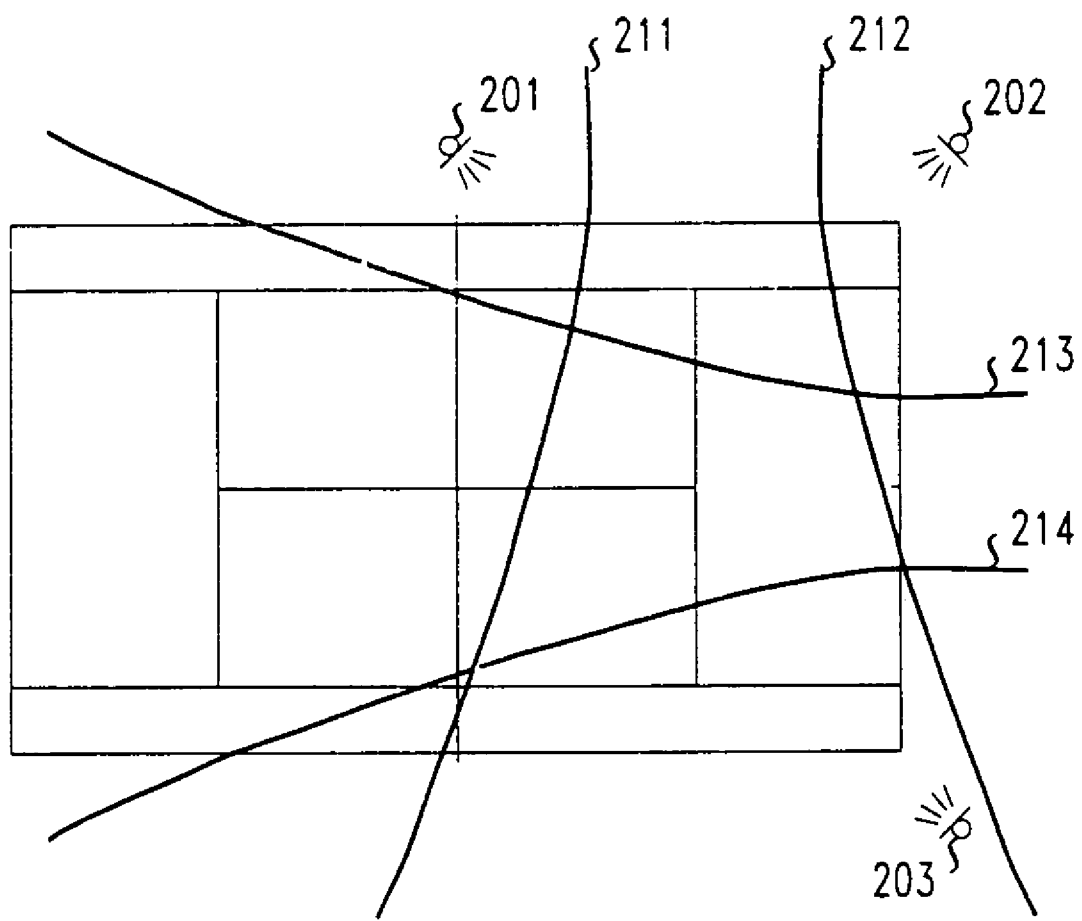
FIG. 2 shows a view of an illustrative tennis court in which two confusion hyperbola have been generated with the use of three microphones or geophones in accordance with the illustrative method for identifying a source location of a wave on a two dimensional surface as diagrammed in FIG. 1.

FIG. 2 shows a view of an illustrative tennis court in which two confusion hyperbola have been generated with the use of three microphones or geophones in accordance with the illustrative method for identifying a source location of a wave on a two dimensional surface as diagrammed in FIG. 1. Specifically, three microphones or geophones (illustratively shown as microphone/geophone 201, microphone/geophone 202, and microphone/geophone 203) are placed on or near the surface. In accordance with the illustrative method diagrammed in FIG. 1, microphone/geophone 201 and microphone/geophone 202 advantageously combine to generate one confusion hyperbola (containing hyperbola branch 211 and hyperbola branch 212), and microphone/geophone 202 and microphone/geophone 203 advantageously combine to generate another confusion hyperbola (containing hyperbola branch 213 and hyperbola branch 214). Thus, four intersection points result—one at the intersection of hyperbola branch 211 and hyperbola branch 213; one at the intersection of hyperbola branch 211 and hyperbola branch 214; one at the intersection of hyperbola branch 212 and hyperbola branch 213; and one at the intersection of hyperbola branch 212 and hyperbola branch 214. These four intersection points may then be advantageously disambiguated in accordance with the illustrative method of FIG. 1 and as described above.

Figure 3:
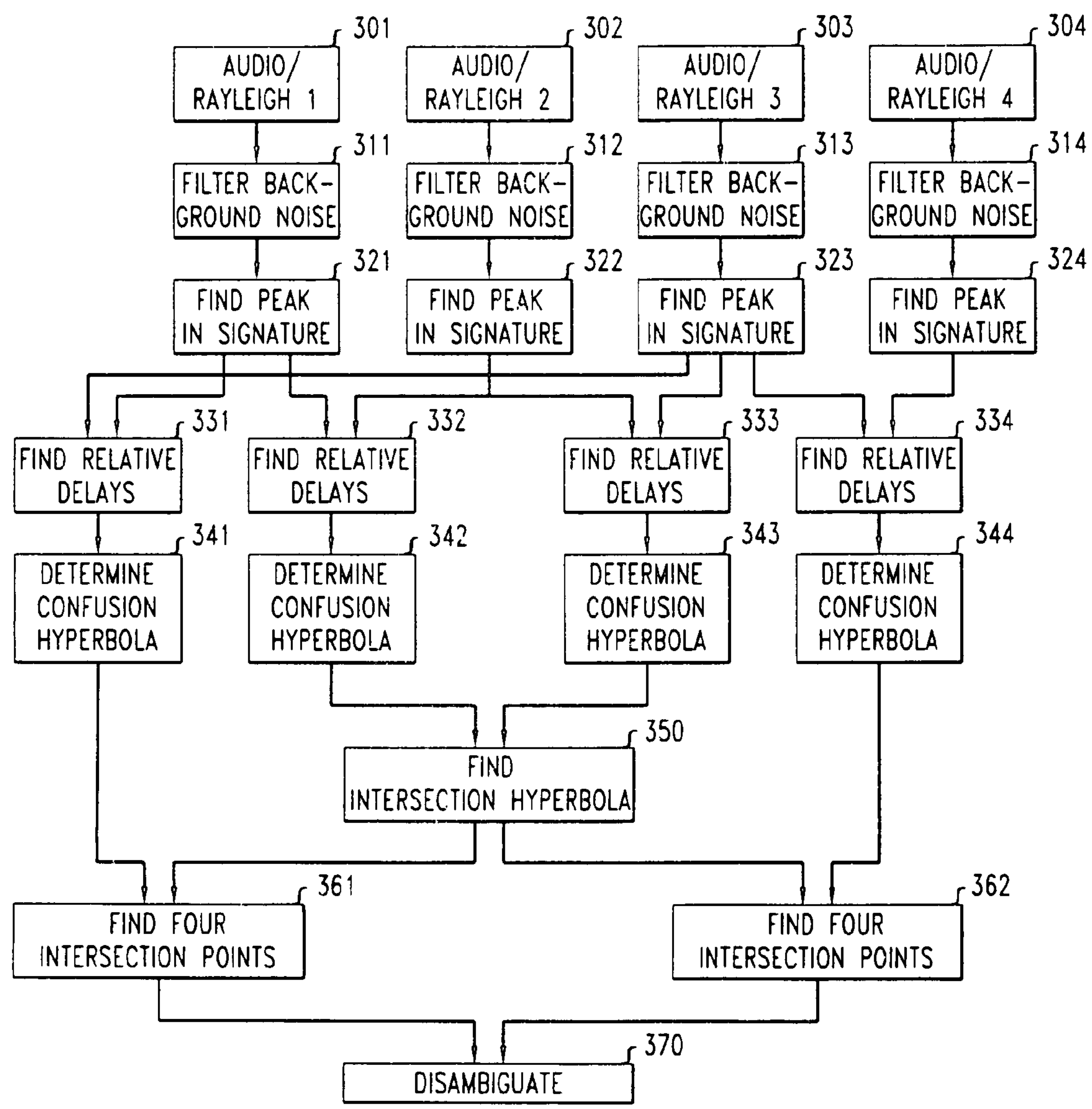
FIG. 3 diagrams an illustrative method for identifying a source location of a wave in a three dimensional space with the use of four microphones or geophones in accordance with certain other illustrative embodiments of the present invention.

An Illustrative Method for Identifying a Source Location of a Wave in Three Dimensions FIG. 3 diagrams an illustrative method for identifying a source location of a wave in a three dimensional space with the use of four microphones or geophones in accordance with certain other illustrative embodiments of the present invention. The four microphones or geophones are shown as blocks 301, 302, 303 and 304 in the figure. Blocks 311, 312, 313 and 314 advantageously perform an initial filtering of the background noise from the signals received by the microphones/geophones. Then, blocks 321, 322, 323 and 324 find the peaks in the corresponding signature of the resultant (i.e., noise-filtered) signals. For example, the tasks of blocks 321, 322, 323 and 324 may make use of an adaptive impulse detection technique, as described above and as is fully familiar to those skilled in the art, in order to identify the particular signature of interest (e.g., the signature of a tennis ball hitting a racket).

Once the peaks corresponding to the desired signature have been located, blocks 331, 332, 333 and 334 illustratively find the relative delays between each of four distinct pairs of microphones/geophones: microphone/geophone 1 and microphone/geophone 3 (as shown in blocks 301 and 303); microphone/geophone 1 and microphone/geophone 2 (as shown in blocks 301 and 302); microphone/geophone 2 and microphone/geophone 3 (as shown in blocks 302 and 303); and microphone/geophone 3 and microphone/geophone 4 (as shown in blocks 303 and 304), respectively. Based on these four relative delays, blocks 341, 342, 343, and 344 advantageously determine corresponding confusion hyperboloids, as described above. Then, based on the two confusion hyperboloids determined by blocks 342 and 343, an intersection hyperbola is determined in block 350. Next, two sets of four intersection points each are identified by blocks 361 and 362—one set based on the intersection between the confusion hyperboloid determined by block 341 and the intersection hyperbola as determined by block 350, and the other set based on the intersection between the confusion hyperboloid determined by block 344 and the intersection hyperbola as determined by block 350. (Note that it will be obvious to those of ordinary skill in the art that the selection of the particular pair of confusion hyperboloids which are combined to form the intersection hyperbola in block 350 is totally arbitrary.) And finally, as also described above, disambiguation amongst these intersection points is advantageously performed by block 370 to identify the source location of the wave.

Figure 4:
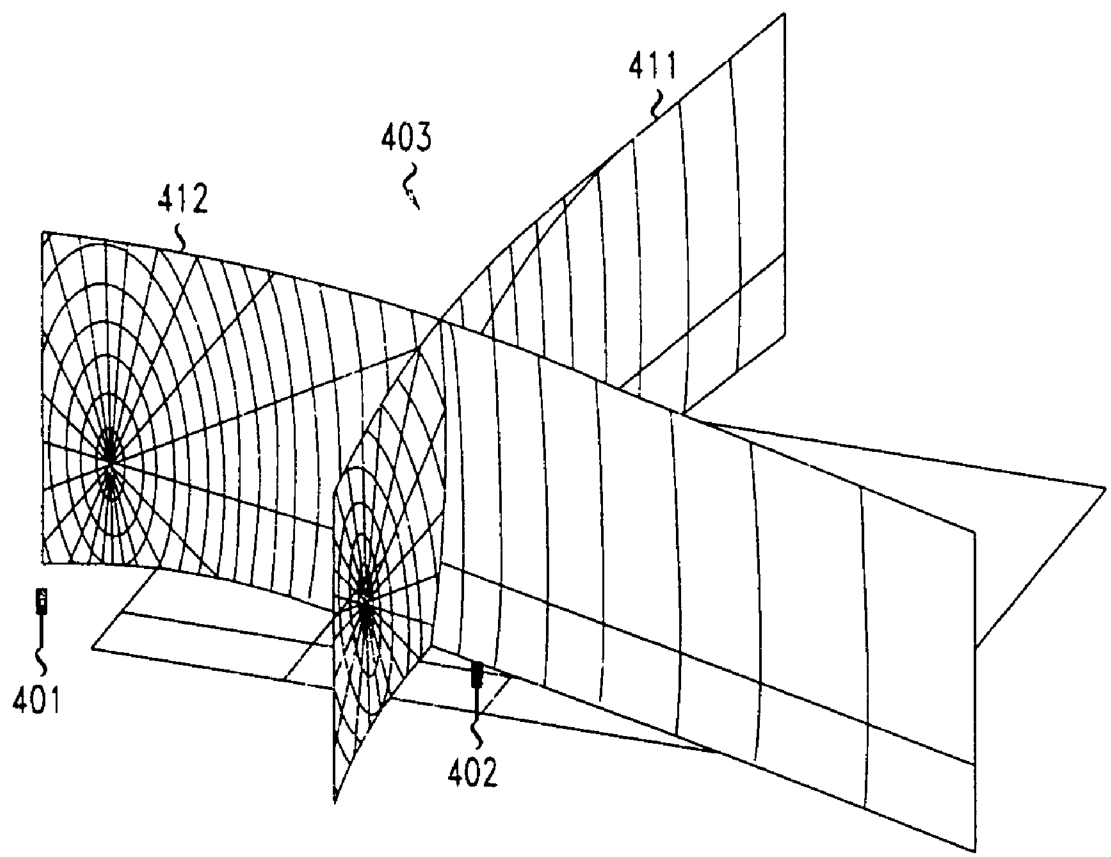
FIG. 4 shows a view of an illustrative tennis court in which one sheet of each of two confusion hyperboloids generated by three microphones produces an intersection hyperbola for use in the illustrative method for identifying a source location of a wave in a three dimensional space as diagrammed in FIG. 3.

FIG. 4 shows a view of an illustrative tennis court in which one sheet of each of two confusion hyperboloids generated by three microphones produces an intersection hyperbola for use in the illustrative method for identifying a source location of a wave in a three dimensional space as diagrammed in FIG. 3. In particular, the figure shows sheet 411 of a first confusion hyperboloid (having been determined, for example, by block 342 of the illustrative method diagramed in FIG. 3) which has been generated by a first pair of microphones comprising microphone 401 and microphone 402, and sheet 412 of a second confusion hyperboloid (having been determined, for example, by block 343 of the illustrative method diagramed in FIG. 3) which has been generated by a second pair of microphones comprising microphone 402 and microphone 403. (Note that microphone 403 is not visible in the drawing, but is located on the opposite side of sheet 412 from microphone 402). Advantageously, each of the microphones is positioned approximately 3.5 feet above the playing surface. It will be appreciated by one skilled in the art that these two hyperboloid sheets (i.e., sheet 411 and sheet 412) intersect to form one branch of a hyperbola as shown (and as determined, for example, by block 350 of the illustrative method diagramed in FIG. 3). Then, in accordance with the illustrative method diagramed in FIG. 3, this resultant intersection hyperbola may be advantageously combined with each of two other confusion hyperboloids (i.e., as determined by blocks 341 and 344, respectively) to generate two sets of intersection points which may then be disambiguated.

Addendum to the Detailed Description

It should be noted that all of the preceding discussion merely illustrates the general principles of the invention. It will be appreciated that those skilled in the art will be able to devise various other arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future—i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Thus, the blocks shown, for example, in such flowcharts may be understood as potentially representing physical elements, which may, for example, be expressed in the instant claims as means for specifying particular functions such as are described in the flowchart blocks. Moreover, such flowchart blocks may also be understood as representing physical signals or stored physical data, which may, for example, be comprised in such aforementioned computer readable medium such as disc or semiconductor storage devices.

The functions of the various elements shown in the figures, including functional blocks labeled as "processors" or "modules" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof any element expressed as a means for performing a specified function is intended to encompass any way of performing that function including, for example, (a) a combination of circuit elements which performs that function or (b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent (within the meaning of that term as used in 35 U.S.C. 112, paragraph 6) to those explicitly shown and described herein.

We claim:

1. A method for tracking an object using one or more video cameras and a plurality of wave receivers, the video cameras outputting corresponding video images including a sequence of video frames, each of the wave receivers for use in determining an arrival of a wave, the method comprising the steps of:

obtaining a first current frame and a corresponding previous frame from each of said video images, wherein each of said frames includes an image of the object;

determining a first motion vector corresponding to a first direction of motion of the object based on said first current frames and said corresponding previous frames from said video images;

detecting an arrival of a wave by each one of one or more pairs of said wave receivers, wherein said wave has been generated by an impact of said object at a source location;

determining one or more time differences between each of said arrivals of said wave at each of said one or more pairs of wave receivers;

determining a location of a change in direction of said object by identifying the source location from which said wave has been generated based on said plurality of time differences;

obtaining a second current frame from each of said video images, wherein each of said frames includes an image of the object; and determining a second motion vector corresponding to a second direction of motion of the object based on said second current frames from each of said video images and based on said determined location of said change in direction of said object, said second motion vector representing a direction of motion of said object after said change in direction of said object has occurred.

2. The method of claim 1 wherein said wave receivers comprise microphones and wherein said waves comprise acoustic waves.

3. The method of claim 1 wherein said wave receivers comprise geophones and wherein said waves comprise Rayleigh surface waves.

4. The method of claim 1 wherein said change in direction of said object results from a deflection of said object by another object.

5. The method of claim 4 wherein said object comprises a tennis ball, said other object comprises a tennis racket, and said location of a change in direction of said object comprises a location at which said tennis racket impacts said tennis ball.

6. The method of claim 1 wherein said change in direction of said object results from a deflection of said object by a ground surface.

7. The method of claim 6 wherein said object comprises a tennis ball, said ground surface comprises a tennis court playing surface, and said location of a change in direction of said object comprises a location at which said tennis ball impacts said tennis court playing surface.

8. An apparatus for tracking an object using one or more video cameras and a plurality of wave receivers, the video cameras outputting corresponding video images including a sequence of video frames, each of the wave receivers for use in determining an arrival of a wave, the apparatus comprising:

means for obtaining a first current frame and a corresponding previous frame from each of said video images, wherein each of said frames includes an image of the object;

means for determining a first motion vector corresponding to a first direction of motion of the object based on said first current frames and said corresponding previous frames from each of said video images;

means for detecting an arrival of a wave by each one of one or more pairs of said wave receivers, wherein said wave has been generated by an impact of said object at a source location;

means for determining one or more time differences between each of said arrivals of said wave at each of one or more pairs of wave receivers;

means for determining a location of a change in direction of said object by identifying the source location from which said wave has been generated based on said plurality of time differences;

means for obtaining a second current frame from each of said plurality of said video images, wherein each of said frames includes an image of the object; and means for determining a second motion vector corresponding to a second direction of motion of the object based on said second current frames from each of said video images and based on said determined location of said change in direction of said object, said second motion vector representing a direction of motion of said object after said change in direction of said object has occurred.

9. The apparatus of claim 8 wherein said wave receivers comprise microphones and wherein said waves comprise acoustic waves.

10. The apparatus of claim 8 wherein said wave receivers comprise geophones and wherein said waves comprise Rayleigh surface waves.

11. The apparatus of claim 8 wherein said change in direction of said object results from a deflection of said object by another object.

12. The apparatus of claim 11 wherein said object comprises a tennis ball, said other object comprises a tennis racket, and said location of a change in direction of said object comprises a location at which said tennis racket impacts said tennis ball.

13. The apparatus of claim 8 wherein said change in direction of said object results from a deflection of said object by a ground surface.

14. The apparatus of claim 13 wherein said object comprises a tennis ball, said ground surface comprises a tennis court playing surface, and said location of a change in direction of said object comprises a location at which said tennis ball impacts said tennis court playing surface.

15. A method for initiating a process of tracking an object using one or more video cameras and a plurality of wave receivers, the video cameras outputting corresponding video images including a sequence of video frames, each of the wave receivers for use in determining an arrival of a wave, the method comprising the steps of:

detecting an arrival of a wave by each one of one or more pairs of said wave receivers, wherein said wave has been generated by an impact of said object at a source location;

determining one or more time differences between each of said arrivals of said wave at each of said one or more pairs of wave receivers;

determining an initial location of said object by identifying the source location from which said wave has been generated based on said plurality of time differences;

obtaining a video frame from each of said video images, wherein each of said frames includes an image of the object; and determining an initial motion vector corresponding to an initial direction of motion of the object based on said video frames from each of said video images and based on said determined initial location of said object.

16. The method of claim 15 wherein said wave receivers comprise microphones and wherein said waves comprise acoustic waves.

17. The method of claim 15 wherein said initial location of said object comprises a location at which said object is impacted by another object.

18. The method of claim 17 wherein said object comprises a tennis ball and said other object comprises a tennis racket.

19. An apparatus for initiating a process of tracking an object using one or more video cameras and a plurality of wave receivers, the video cameras outputting corresponding video images including a sequence of video frames, each of the wave receivers for use in determining an arrival of a wave, the apparatus comprising:

means for detecting an arrival of a wave by each one of one or more pairs of said wave receivers, wherein said wave has been generated by an impact of said object at a source location;

means for determining one or more time differences between each of said arrivals of said wave at each of said one or more pairs of wave receivers;

means for determining an initial location of said object by identifying the source location from which said wave has been generated based on said plurality of time differences;

means for obtaining a video frame from each of said video images, wherein each of said frames includes an image of the object; and means for determining an initial motion vector corresponding to an initial direction of motion of the object based on said video frames from each of said video images and based on said determined initial location of said object.

20. The apparatus of claim 19 wherein said wave receivers comprise microphones and wherein said waves comprise acoustic waves.

21. The apparatus of claim 19 wherein said initial location of said object comprises a location at which said object is impacted by another object.

22. The apparatus of claim 21 wherein said object comprises a tennis ball and said other object comprises a tennis racket.

23. A method for terminating a process of tracking an object using one or more video cameras and a plurality of wave receivers, the video cameras outputting corresponding video images including a sequence of video frames, each of the wave receivers for use in determining an arrival of a wave, the method comprising the steps of:

obtaining a current frame and a corresponding previous frame from each of said video images, wherein each of said frames includes an image of the object;

determining a motion vector corresponding to a direction of motion of the object based on said current frames and said corresponding previous frames from said video images;

detecting an arrival of a wave by each one of one or more pairs of said wave receivers, wherein said wave has been generated by an impact of said object at a source location;

determining one or more time differences between each of said arrivals of said wave at each of said one or more pairs of wave receivers;

determining a location of said object by identifying the source location from which said wave has been generated based on said plurality of time differences; and terminating said tracking process based on the determined location of said object.

24. The method of claim 23 wherein said wave receivers comprise microphones and wherein said waves comprise acoustic waves.

25. The method of claim 23 wherein said wave receivers comprise geophones and wherein said waves comprise Rayleigh surface waves.

26. The method of claim 23 wherein said determined location of said object is located on a ground surface.

27. The method of claim 26 wherein said object comprises a tennis ball, said ground surface comprises a tennis court playing surface, and said determined location of said object comprises a location at which said tennis ball impacts said tennis court playing surface.

28. An apparatus for terminating a process of tracking an object using one or more video cameras and a plurality of wave receivers, the video cameras outputting corresponding video images including a sequence of video frames, each of the wave receivers for use in determining an arrival of a wave, the apparatus comprising:

means for obtaining a current frame and a corresponding previous frame from each of said video images, wherein each of said frames includes an image of the object;

means for determining a motion vector corresponding to a direction of motion of the object based on said current frames and said corresponding previous frames from said video images;

means for detecting an arrival of a wave by each one of one or more pairs of said wave receivers, wherein said wave has been generated by an impact of said object at a source location;

means for determining one or more time differences between each of said arrivals of said wave at each of said one or more pairs of wave receivers;

means for determining a location of said object by identifying the source location from which said wave has been generated based on said plurality of time differences; and means for terminating said tracking process based on the determined location of said object.

29. The apparatus of claim 28 wherein said wave receivers comprise microphones and wherein said waves comprise acoustic waves.

30. The apparatus of claim 28 wherein said wave receivers comprise geophones and wherein said waves comprise Rayleigh surface waves.

31. The apparatus of claim 28 wherein said determined location of said object is located on a ground surface.

32. The apparatus of claim 31 wherein said object comprises a tennis ball, said ground surface comprises a tennis court playing surface, and said determined location of said object comprises a location at which said tennis ball impacts said tennis court playing surface.

* * * * *